(12) United States Patent
Kim et al.

(10) Patent No.: US 11,151,745 B2
(45) Date of Patent: Oct. 19, 2021

(54) IMAGE ACQUISITION APPARATUS AND METHOD THEREFOR

(71) Applicant: LG INNOTEK CO., LTD., Seoul (KR)

(72) Inventors: Joo Hyung Kim, Seoul (KR); Seung Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 186 days.

(21) Appl. No.: 16/095,583

(22) PCT Filed: Apr. 19, 2017

(86) PCT No.: PCT/KR2017/004211
§ 371 (c)(1),
(2) Date: Oct. 22, 2018

(87) PCT Pub. No.: WO2017/183915
PCT Pub. Date: Oct. 26, 2017

(65) Prior Publication Data
US 2019/0087977 A1    Mar. 21, 2019

(30) Foreign Application Priority Data

Apr. 20, 2016  (KR) .................. 10-2016-0048444

(51) Int. Cl.
*G06T 7/80*    (2017.01)
*H04N 5/33*    (2006.01)
(Continued)

(52) U.S. Cl.
CPC .................. *G06T 7/80* (2017.01); *B60R 1/00* (2013.01); *B60W 50/14* (2013.01); *G06T 5/006* (2013.01);
(Continued)

(58) Field of Classification Search
CPC ....... G06T 7/80; G06T 5/006; G06T 2207/00; H04N 5/247; G06K 9/0057; G01B 11/24; B60R 1/08
See application file for complete search history.

(56) References Cited

U.S. PATENT DOCUMENTS

| 8,184,160 | B2* | 5/2012 | Hongo | ..................... G06T 7/33 348/148 |
| 8,432,443 | B2* | 4/2013 | Nam | ..................... G06T 7/285 348/135 |

(Continued)

FOREIGN PATENT DOCUMENTS

| KR | 20-0285649 Y1 | 8/2002 |
| KR | 10-2013-0068258 A | 6/2013 |

(Continued)

OTHER PUBLICATIONS

Camera-based calibration techniques for seamless multi projector displays; Brown; 2005. (Year: 2005).*

(Continued)

*Primary Examiner* — Luis Perez-Fuentes
(74) *Attorney, Agent, or Firm* — Birch, Stewart, Kolasch & Birch, LLP

(57) ABSTRACT

The present embodiment relates to image acquisition and, in particular, to an image acquisition apparatus for acquiring images by a camera installed in a vehicle, and a method therefor. The image acquisition apparatus according to the present embodiment comprises: a projector for illuminating a reference pattern to the ground; a first camera unit for capturing an image of the reference pattern illuminated by the projector; a second camera unit for capturing an image; and a control unit for analyzing a pattern captured by the first camera unit and processing the image captured by the second camera unit.

20 Claims, 11 Drawing Sheets

(51) Int. Cl.

| | | |
|---|---|---|
| *B60W 50/14* | (2020.01) | |
| *G06T 7/73* | (2017.01) | |
| *H04N 7/18* | (2006.01) | |
| *G06T 7/33* | (2017.01) | |
| *H04N 5/217* | (2011.01) | |
| *H04N 17/00* | (2006.01) | |
| *H04N 5/232* | (2006.01) | |
| *B60R 1/00* | (2006.01) | |
| *G06T 5/00* | (2006.01) | |
| *H04N 5/247* | (2006.01) | |

(52) U.S. Cl.
CPC .............. *G06T 7/337* (2017.01); *G06T 7/74* (2017.01); *H04N 5/217* (2013.01); *H04N 5/23206* (2013.01); *H04N 5/23238* (2013.01); *H04N 5/247* (2013.01); *H04N 5/33* (2013.01); *H04N 7/18* (2013.01); *H04N 7/183* (2013.01); *H04N 17/002* (2013.01); *B60R 2300/105* (2013.01); *B60R 2300/305* (2013.01); *B60R 2300/306* (2013.01); *B60R 2300/307* (2013.01); *B60R 2300/60* (2013.01); *B60R 2300/8093* (2013.01); *G06T 2207/10152* (2013.01); *G06T 2207/30204* (2013.01); *G06T 2207/30244* (2013.01); *G06T 2207/30264* (2013.01)

(56) References Cited

U.S. PATENT DOCUMENTS

| | | | | |
|---|---|---|---|---|
| 8,487,991 | B2* | 7/2013 | Zhang | G06K 9/00798 348/119 |
| 8,599,258 | B2* | 12/2013 | Ehlgen | G06K 9/00791 348/148 |
| 8,760,515 | B2* | 6/2014 | Abe | B60R 1/00 345/427 |
| 8,908,037 | B2* | 12/2014 | Inui | H04N 17/002 348/148 |
| 9,694,498 | B2* | 7/2017 | Konolige | G06T 7/593 |
| 2007/0008091 | A1* | 1/2007 | Takenaga | B62D 15/0295 340/435 |
| 2008/0231710 | A1* | 9/2008 | Asari | H04N 17/002 348/187 |
| 2010/0110194 | A1* | 5/2010 | Euler | B60R 1/00 348/149 |
| 2013/0135474 | A1* | 5/2013 | Sakano | G06K 9/00791 348/148 |
| 2013/0342692 | A1* | 12/2013 | Li | G06T 7/00 348/143 |
| 2014/0043473 | A1* | 2/2014 | Gupta | H04N 17/002 348/135 |
| 2014/0247354 | A1 | 9/2014 | Knudsen | |
| 2015/0009295 | A1 | 1/2015 | Kim et al. | |
| 2015/0109446 | A1* | 4/2015 | Takano | H04N 7/18 348/148 |
| 2015/0169980 | A1* | 6/2015 | Matsuda | G06K 9/4661 382/103 |
| 2015/0172635 | A1 | 6/2015 | Kimmel et al. | |
| 2015/0341629 | A1 | 11/2015 | Zeng et al. | |
| 2015/0353010 | A1* | 12/2015 | Baek | H04N 7/181 348/148 |
| 2016/0086040 | A1* | 3/2016 | Kuehnle | G06K 9/00805 382/103 |
| 2016/0176343 | A1* | 6/2016 | Sakano | G06K 9/52 348/148 |
| 2016/0288330 | A1* | 10/2016 | Konolige | H04N 13/254 |
| 2017/0129389 | A1* | 5/2017 | Asaoka | G01M 11/068 |
| 2019/0087977 | A1* | 3/2019 | Kim | G06T 7/337 |

FOREIGN PATENT DOCUMENTS

| | | |
|---|---|---|
| KR | 10-2014-0091113 A | 7/2014 |
| KR | 10-2014-0096429 A | 8/2014 |
| KR | 10-2015-0004989 A | 1/2015 |
| WO | WO-2012143036 A1 * 10/2012 | ............... G06T 7/80 |

OTHER PUBLICATIONS

Automatic camera calibration for driver assistance systems; Ribeiro; 2006. (Year: 2006).*
Field Demonstration Heavy Vehicle Camera imaging system; 2011 (Year: 2011).*
Automatic camera calibration for driver assistance systems; Anderson; 2006. (Year: 2006).*
Self-calibration of an On-Board Driver Assistance Systems; Collado; 2006. (Year: 2006).*
International Search Report for PCT/KR2017/004211 dated Jul. 24, 2017.

* cited by examiner

FIG. 7
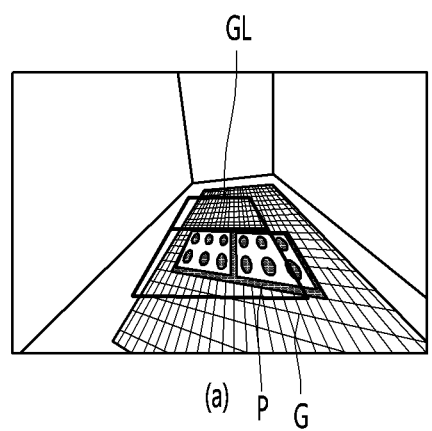
(a) P G
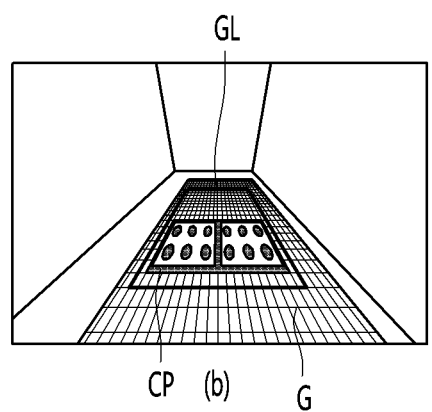
CP (b) G

IMAGE ACQUISITION APPARATUS AND METHOD THEREFOR

CROSS REFERENCE TO RELATED APPLICATIONS

This application is the National Phase of PCT International Application No. PCT/KR2017/004211, filed on Apr. 19, 2017, which claims priority under 35 U.S.C. 119(a) to Patent Application No. 10-2016-0048444, filed in Republic of Korea on Apr. 20, 2016, all of which are hereby expressly incorporated by reference into the present application.

TECHNICAL FIELD

The present embodiment relates to image acquisition and, in particular, to an image acquisition apparatus for acquiring images by a camera installed in a vehicle, and a method therefor.

BACKGROUND ART

In general, a system for monitoring surroundings of a vehicle by a camera mounted on the vehicle is widely known. Such a system may acquire images from a plurality of cameras installed in the vehicle, and may acquire status information around the vehicle according to the camera images.

At this point, it is necessary to accurately calculate in advance which position and which direction the camera installed in the vehicle is mounted. Such a calculation is referred to as a calibration of the camera. In general vehicles, each camera captures feature points that already know a coordinate position in the factory before delivery. The captured image is compared with each reference coordinate point by 1:1, and the calibration is performed according to the result value.

Such a calibration of the vehicle is performed first at the time of vehicle shipment. Alternatively, the calibration may be executed, when another device and another pattern for calibration is provided at the time of further maintenance or factory re-incoming.

The calibration of the vehicle requires high reliability in image acquisition for safe driving of the vehicle and peripheral recognition. Therefore, when the camera is deviated from the reference position due to an impact of the outside and the inside of the vehicle or the like, it is absolutely required to correct the position of the image or the camera. However, there is a problem that even though the correction request as described above occurs, calibration should be performed in a separate apparatus and environment.

In addition, even though there is a problem in calibration, when a user does not recognize the necessity of calibration of the camera image, accordingly, additional safety problems may occur.

SUMMARY OF DISCLOSURE

Technical Problem

An embodiment provides an image acquisition apparatus capable of improving accuracy and reliability of an image captured from a camera mounted on a vehicle, and a method therefor.

In addition, an embodiment provides an image acquisition apparatus capable of improving accuracy of images captured by multiple cameras with images of cameras with improved reliability, and a method thereof.

Further, an embodiment provides an image acquisition apparatus and a method therefor for easily detecting an object becoming adjacent to a periphery of a vehicle and enabling a driver to quickly recognize a danger.

The technical problems to be solved in the proposed embodiments may not be limited to the technical problems mentioned above, and other technical subjects not mentioned may be clearly understood by those skilled in the art to which the embodiments proposed from the following description belong.

Technical Solution

An image acquisition apparatus according to the present embodiment, in order to achieve the above purpose, includes a projector for irradiating a reference pattern onto the ground, a first camera unit for capturing the reference pattern irradiated by the projector, a second camera unit for capturing an image, and a control unit for analyzing a pattern captured by the first camera unit and processing the image captured by the second camera unit.

In addition, a method of acquiring an image according to the present embodiment includes irradiating a reference pattern onto the ground, capturing the irradiated reference pattern by a first camera unit, capturing an image by a second camera unit, analyzing an image of the reference pattern captured by the first camera unit, and processing the image captured by the second camera unit based on the analyzed reference pattern image.

Advantageous Effects

An image acquisition apparatus and a method therefor according to an embodiment has an effect of accurately providing a driver with status information around a vehicle by acquiring images with high accuracy and reliability in a camera installed in the vehicle.

In addition, according to an embodiment, an image captured via a camera is corrected corresponding to a positional deviation of the camera installed in a vehicle, and thus the image and status information around the vehicle can be acquired accurately regardless of status of the camera.

Further, according to an embodiment, when an image captured from a plurality of cameras is edited into an AVM (Around View Monitoring) image and is displayed, an image synthesis can be performed more accurately.

Furthermore, according to an embodiment, it is possible to provide a user with information of an object approaching a vehicle by monitoring around the vehicle.

In addition, according to an embodiment, by irradiating a reference pattern onto the ground, calibration of a camera can be easily performed even in an environment in which a separate fixture is not required.

In addition, according to an embodiment, when infrared rays is adopted as a reference pattern, by irradiating the reference pattern onto the ground, it has an effect that the loss of the infrared rays captured in a daytime environment can be minimized.

DESCRIPTION OF DRAWINGS

FIG. 7 is an exemplary view illustrating a status of a camera image according to an embodiment.

DETAILED DESCRIPTION OF EXEMPLARY EMBODIMENTS

Hereinafter, embodiments of the present invention will be described in detail with reference to the accompanying drawings. At this point, it should be noted that the same components are denoted by the same reference symbols as possible in the accompanying drawings. Further, the detailed description of known functions and configurations that may obscure the gist of the present invention will be omitted.

Figure 1:
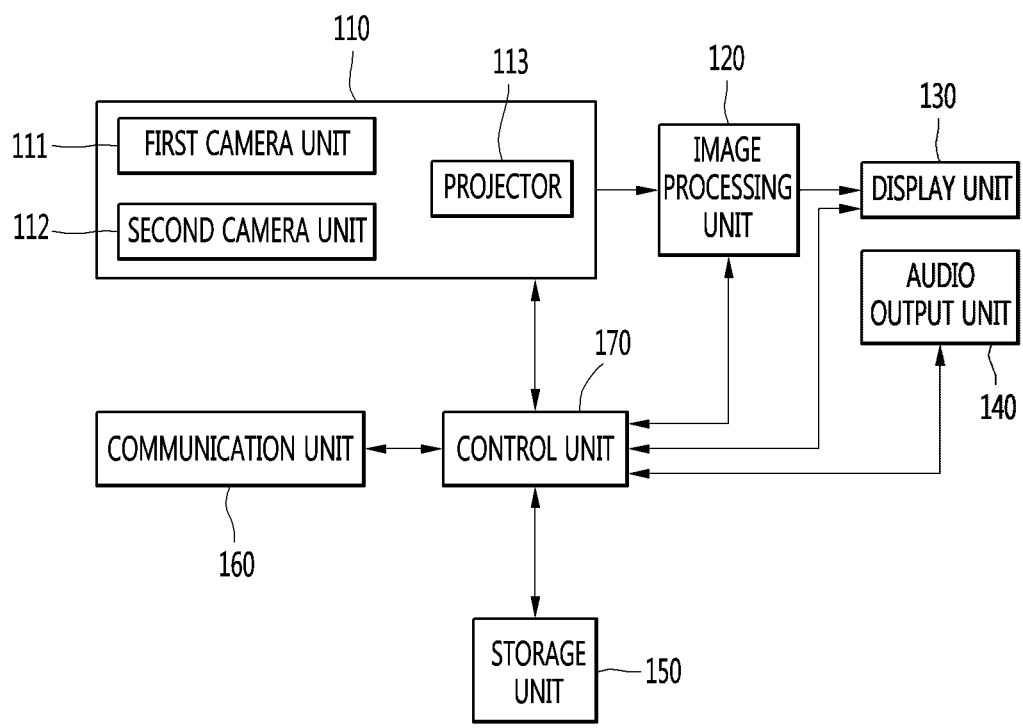
FIG. 1 is a configuration diagram of an image acquisition apparatus according to the present embodiment.
Figure 2:
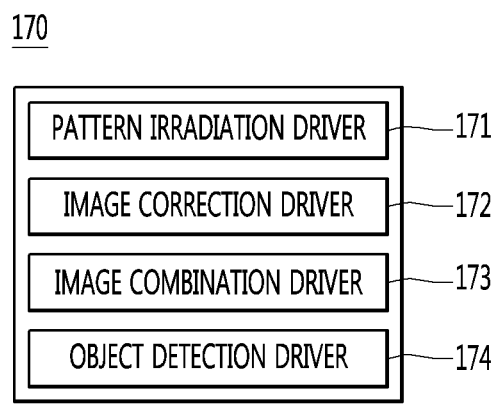
FIG. 2 is a detailed configuration diagram of a control unit of the image acquisition apparatus according to the present embodiment.

FIG. 1 is a configuration diagram of an image acquisition apparatus according to the present embodiment, and FIG. 2 is a detailed configuration diagram of a control unit of the image acquisition apparatus according to the present embodiment.

Referring to FIGS. 1 and 2, the image acquisition apparatus according to an embodiment includes an imaging unit 110, an image processing unit 120, a display unit 130, an audio output unit 140, a storage unit 150, a communication unit 160, and a control unit 170.

The imaging unit 110 may be disposed at front, rear, left, and right sides of a vehicle to acquire images around the vehicle. In an embodiment, it will be described as an example of constituting four imaging units 110. However, the present invention is not limited thereto, and the configuration of a camera may be variable according to performance of the camera or a capturing range.

A camera unit constituting the imaging unit 110 is constituted of an IR camera 111 (hereinafter referred to as a first camera unit) capable of capturing infrared images and an RGB camera 112 (hereinafter referred to as a second camera unit) capable of capturing RGB images.

The IR camera 111 and the RGB camera 112 may constitute a RGB module and an IR module in one piece. Alternatively, the RGB module and the IR module may be configured in separate modules, respectively.

The imaging unit 110 includes a projector 113 so as to correspond to the camera units 111 and 112. Specifically, the projector 113 irradiates a reference pattern for an image to be captured by the IR camera unit 111. The reference pattern may be infrared rays. The RGB camera unit 112 captures an image around the vehicle.

In the projector 113, a number or a position value of the reference pattern(s) to be irradiated may vary according to an image to be acquired or a run mode. The IR camera unit 111 captures the reference pattern irradiated from the projector 113. It is possible to detect correction of the image, a combination of the images, or an object around the vehicle, based on pattern information and reference pattern information acquired from the captured image. In the present embodiment, although it has been described as an example that the camera units 111 and 112 and the projector 113 are integrally formed in the imaging unit 110, the camera units 111 and 112 and the projector 113 may be separately constituted. When the camera units 111 and 112 and the projector 113 are separately constituted, distance information between the camera units 111 and 112 and the projector 113 is required.

The image processing unit 120 generates or processes an image to be captured by the camera units 111 and 112 or an image to be outputted from the display unit 130. Specifically, the image processing unit 120 combines images captured by the second camera unit 112 based on a position of the reference pattern. In addition, the image processing unit 120 combines an image of an object adjacent to the vehicle with an image captured by the second camera unit 112.

The display unit 130 may display information to be processed by the image acquisition apparatus.

The display unit 130, for example, may include at least one of a liquid crystal display (LCD), a thin film transistor-liquid crystal display (TFT LCD), an organic light-emitting diode (OLED) a flexible display, and a three-dimensional display (3D display).

The audio output unit 140 outputs status and peripheral information of a vehicle as audio data. The audio output unit 140 may output various information such as notification of image correction and notification of an object approaching the vehicle as audio data. The audio output unit 140 may include a speaker.

The storage unit 150 may store a program for an operation of the control unit 170, and may temporarily store data to be input and output. The storage unit 150 may store information on the reference pattern irradiated by the projector 113. Specifically, the storage unit 150 may store information of the reference pattern irradiated by the projector 113 based on the control of the control unit 170 according to a captured image and an operation mode. The reference pattern information may be position information and number information of the pattern. Specifically, the reference pattern may have a dot shape, and may be a different number and position according to an operation mode. However, the shape and the number of the reference pattern(s) are not limited, and the reference pattern may have various shapes according to an embodiment.

The storage unit 150 may include a storage medium of at least one of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The communication unit 160 may include one or more modules that enable communication between image acquisition apparatuses and communication with an external apparatus.

The control unit 170 controls an overall operation of the image acquisition apparatus. The control unit 170 may include a driver for correction or combination of images or object detection as shown in FIG. 2 according to an embodiment. Specifically, the control unit 170 may include a pattern irradiation driver 171, an image correction driver 172, an image combination driver 173, and an object detection driver 174.

The pattern irradiation driver 171 may determine the reference pattern irradiated by the projector 113. Specifically, the pattern irradiation driver 171 may output a control signal to the projector 113 so that various patterns such as a calibration reference pattern for correcting an acquired image, an image combination reference pattern for combining an captured image, and an object monitoring reference pattern for recognizing an object according to an operation mode of the image acquisition apparatus, may be irradiated. For example, the pattern irradiation driver 171 may generate a control signal so as to irradiate six patterns in a matrix form composed of 2×3 reference patterns in a calibration mode. In addition, the pattern irradiation driver 171 may control so as to irradiate a pattern to a capturing region overlapped between adjacent cameras in an image combining mode. For example, an overlapping position between adjacent cameras may be an edge region of a capturing range. Specifically, in the case of a front camera, a left camera and a right camera may be controlled to irradiate a reference pattern to an adjacent edge region. In addition, the pattern irradiation driver 171 may control so as to irradiate more patterns as compared with the above two modes for object detection when the apparatus operates in an object detection mode.

The image correction driver 172 compares a pattern captured by the first camera unit 111 with reference pattern information, and corrects an image captured by the second camera unit 112. Specifically, the image correction driver 172 compares the reference pattern information irradiated by the projector 113 with the captured pattern obtained by capturing the reference pattern irradiated by the projector 113. Therefore, the image correction driver 172 may correct a direction, a rotation angle, or a position of the image captured by the second camera unit 112 according to the comparison result. A specific image correction operation of the image correction driver 172 will be described in detail in the following drawings.

The image combination driver 173 compares the pattern captured by the first camera unit 111 with the reference pattern information and combines a plurality of images captured by the second camera unit 112. Specifically, the image combination driver 173 may set the reference pattern irradiated at a position overlapped between cameras according to a capturing position as a reference position, and combine the images captured by the adjacent cameras. A specific image combination operation of the image combination driver 173 will be described in detail below with reference to the drawings.

The object detector 174 detects presence of an adjacent object and adjacent direction around a vehicle, due to an incident amount, incident direction, etc. of the pattern captured by the first camera 111 by the pattern irradiated by the projector 113. A specific object detection operation of the object detector 174 will be described in detail below with reference to the drawings.

Hereinafter, a method of acquiring an image according to various embodiments will be described in detail based on an image acquisition apparatus constructed according to the above-described embodiment.

Figure 3:
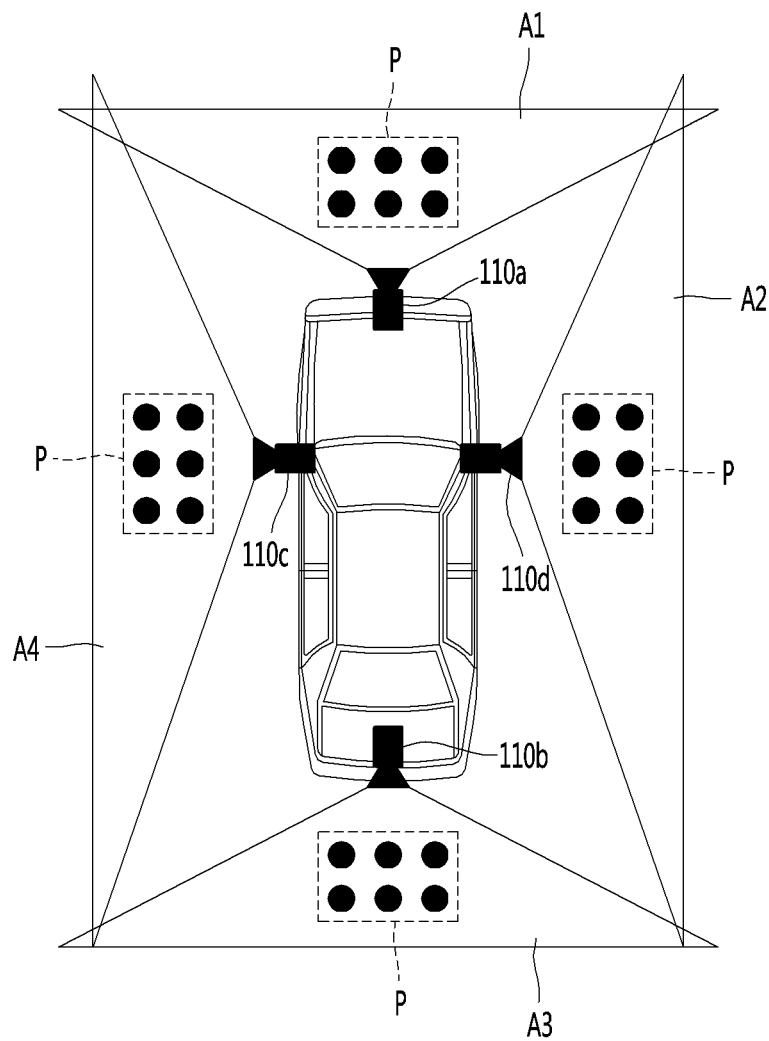
FIGS. 3 and 4 are exemplary views for explaining an image acquisition operation according to one embodiment.
Figure 4:
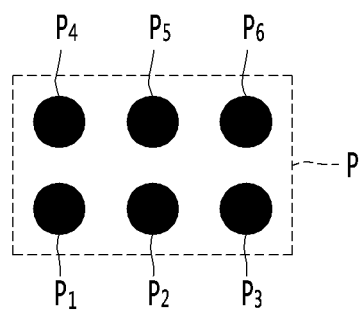
Figure 5:
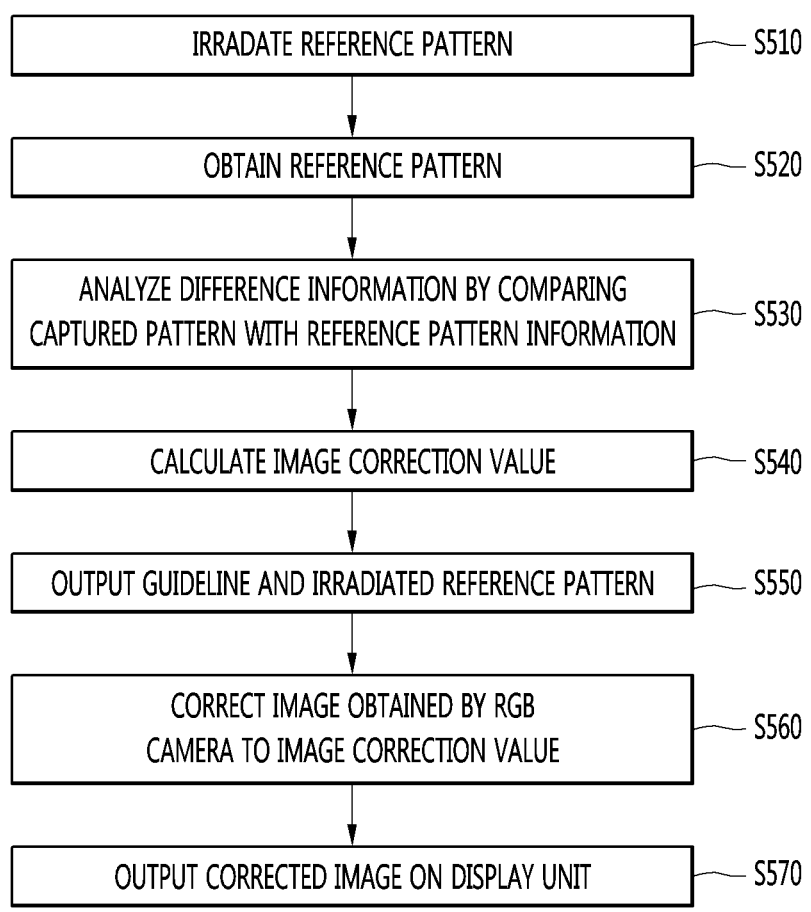
FIG. 5 is a flowchart illustrating an image acquisition operation according to one embodiment.
Figure 6:
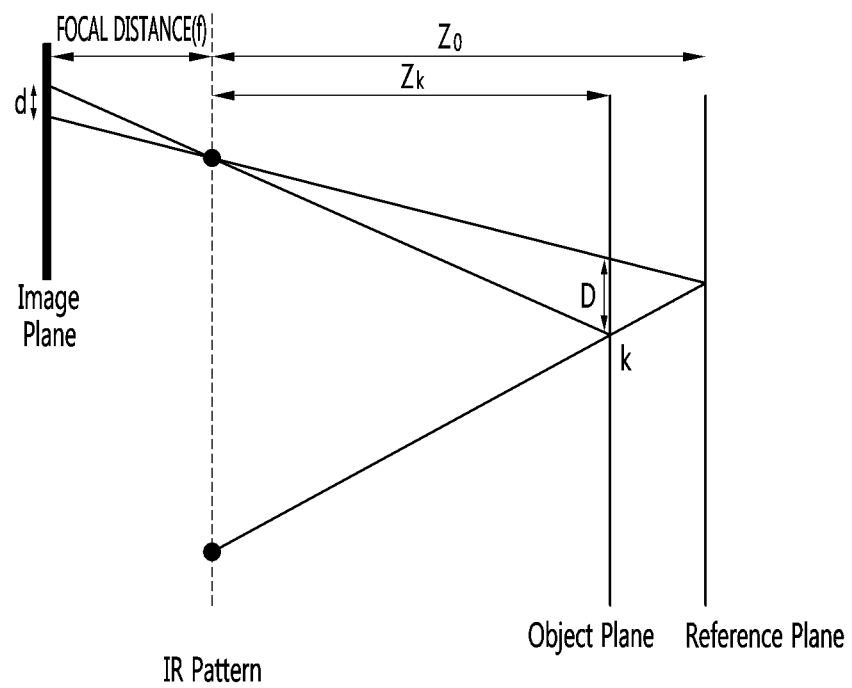
FIG. 6 is an exemplary view for explaining a method of calculating a pattern distance according to an embodiment.

FIGS. 3 and 4 are exemplary views for explaining an image acquisition operation according to an embodiment, FIG. 5 is a flowchart illustrating an image acquisition operation according to one embodiment, and FIG. 7 is an exemplary view illustrating a status of a camera image according to an embodiment.

In the present embodiment, an imaging unit in which a projector for irradiating a reference pattern and a camera for capturing the irradiated reference pattern are configured as one module will be described as an example. However, the present invention is not limited thereto, and the projector and the camera may be installed adjacent to or spaced apart from each other as separate modules depending on a configuration. In addition, in an embodiment, it will be described as an example that the imaging unit 110 is composed of a plurality of cameras for capturing the front, back, left, and right directions of a vehicle. However, the present invention is not limited thereto, and one imaging unit 110 may be installed and driven in various directions and numbers according to a configuration.

Referring to FIGS. 3 to 7, the control unit 170 irradiates the reference pattern to the ground plane on which the vehicle is located by the projector 113 according to the calibration operation mode of the vehicle (S510). The reference pattern to be irradiated by the projector 113 may be infrared rays. Specifically, as shown in FIG. 3, imaging units 110a, 110b, 110c, and 110d is configured to correspond to the front, rear, left, and right directions of the vehicle, and each of the imaging units 110 includes a first camera 111, a second camera 112, and a projector 113. Therefore, the reference pattern is irradiated to the ground plane of the position in which the vehicle is disposed via the projector 113 of each of the imaging units 110a, 110b, 110c, and 110d. For example, the irradiated pattern may be irradiated in the form of a matrix as shown in FIG. 4. However, the present invention is not limited thereto, and reference patterns may be irradiated in various forms and combinations.

The pattern irradiated by the projector 113 is captured by the first camera unit 111 (S520). Specifically, the first camera unit 111 captures a reference pattern P irradiated in capturing ranges A1, A2, A3 and A4 using an infrared channel to acquire a pattern image.

The control unit 170 analyzes difference information by comparing information of the pattern acquired by the first camera unit 111 with information of the reference pattern irradiated by the projector 113 (S530). Specifically, a distance between the first camera 111 and the captured pattern may be calculated via triangulation with respect to the pattern captured by the first camera unit 111 and the reference pattern irradiated by the projector 113.

The distance between the first camera unit 111 and the captured pattern is calculated based on a trigonometric function and is expressed by FIG. 4 and the following Equations 1 and 2. As shown in FIG. 4, the pattern irradiated via the projector 113 to a reference plane based on the information of the reference pattern may have a parallax as a focal distance of the pattern image captured via the first camera unit 111 is recognized in an object plane.

$$\frac{D}{b} = \frac{Z_0 - Z_k}{Z_0} \qquad \text{[Equation 1]}$$

-continued $$\frac{d}{f} = \frac{D}{Z_k} \quad \text{[Equation 2]}$$

Here, Zk is a distance from the first camera 111 at a location k of the image detected in the object plane, Z0 is a depth value in the reference plane, d denotes a parallax recorded by the first camera unit 111, and D is a parallax shifted from the captured pattern.

Entering the D value in Equation 2 into Equation 1, a pattern distance value Zk in the captured image is expressed by Equation 3.

$$Z_k = \frac{Z_0}{1 + \frac{Z_0}{f_o b} d} \quad \text{[Equation 3]}$$

The control unit 170 may calculate a position value for calibration based on the distance of the captured pattern calculated by the above-described Equation 1 and Equation 2 and the position value of the reference pattern irradiated by the projector 113. Specifically, the imaging unit 110 including the first camera unit 111 and the projector 113 is spaced apart from the ground as the imaging unit 110 is located at an upper portion of the vehicle.

Therefore, in order to calculate an accurate position and distance of the pattern, the position information of the irradiated reference pattern and the position and distance information of the captured pattern are converted and calculated based on the ground on which the vehicle is located.

For example, as shown in FIG. 4, the reference pattern irradiated by the projector 113 may be irradiated as shown in Table 1 based on the position value stored in the storage unit 150. Further, the distance of the captured pattern obtained by capturing the irradiated reference pattern by the first camera unit 111 and calculating by Equations 1 to 3 and the value obtained by converting the distance based on the ground may be shown as follows.

TABLE 1

| Pattern No. | Pattern Position Value (A) | | Captured Pattern Position Value (cm) (B) | | | Converted Ground Plane Position Value (cm) (C) | | |
|---|---|---|---|---|---|---|---|---|
| P1 | X: 200 | Y: 400 | X: −30 | Y: 10 | Z: 100 | X: −30 | Y: 0 | Z: 0 |
| P2 | X: 300 | Y: 400 | X: 0 | Y: 10 | Z: 100 | X: 0 | Y: 0 | Z: 0 |
| P3 | X: 400 | Y: 400 | X: 30 | Y: 10 | Z: 100 | X: 30 | Y: 0 | Z: 0 |
| P4 | X: 200 | Y: 500 | X: −30 | Y: 20 | Z: 120 | X: −30 | Y: 30 | Z: 0 |
| P5 | X: 300 | Y: 500 | X: −30 | Y: 20 | Z: 120 | X: 0 | Y: 30 | Z: 0 |
| P6 | X: 400 | Y: 500 | X: 30 | Y: 20 | Z: 120 | X: 30 | Y: 30 | Z: 0 |

The control unit 170 determines whether the image captured by the second camera unit 112 is rotated or moved based on the position value A of the pattern irradiated by the projector 113, the position value B of the pattern captured by the first camera unit 111 and the position value C of the converted captured pattern, and accordingly, the correction value of the image may be calculated (S540). The calculated correction value may be a rotation angle or a movement position value of the image.

When the image correction value is calculated, the control unit 170 outputs the captured pattern P together with a guideline G through the display unit 130 as shown in FIG. 7, so that a user may easily recognize as shown in the example of (a). At this time, since a part of the captured pattern P is displayed at a position deviating from the guideline G, the user may easily recognize the need for the position and the correction of the image captured by the second camera unit 112.

The control unit 170 corrects the image captured by the second camera unit 112 based on the calculated image correction value (S560). The image correction may be a rotation and a position value of the image captured by the second camera unit 112.

The control unit 170 may output the corrected image via the display unit 130. At this point, the control unit 170 outputs an image showing the correction status of the image via the display unit 130 as shown in the example of FIG. 7(*b*). Specifically, a correction result is outputted in a status of the captured pattern located in the guideline G or the like according to the guideline G and the image correction.

In addition, the image correction value may be stored in the storage unit 150. The stored image correction value is stored in the form of a lookup table, and may be used as a database for image correction.

Figure 8:
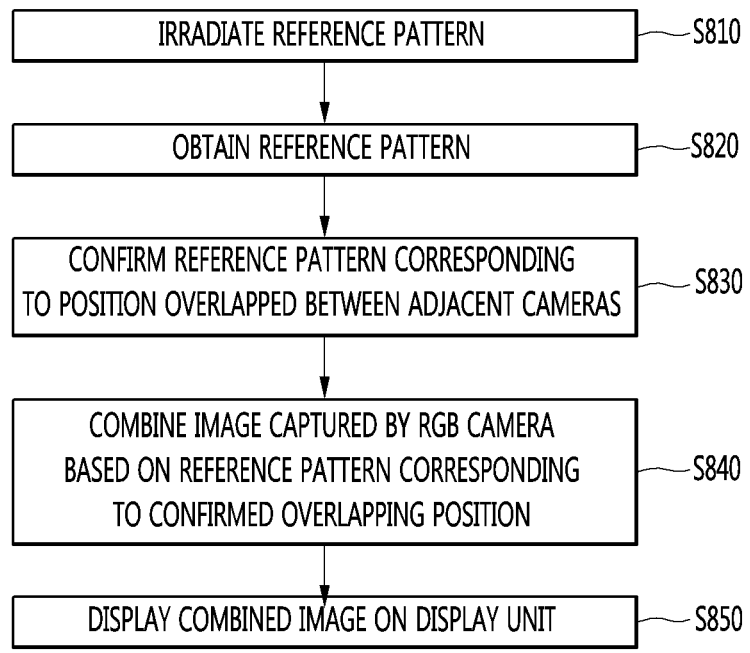
FIG. 8 is a flowchart illustrating an image acquisition operation according to another embodiment.
Figure 9:
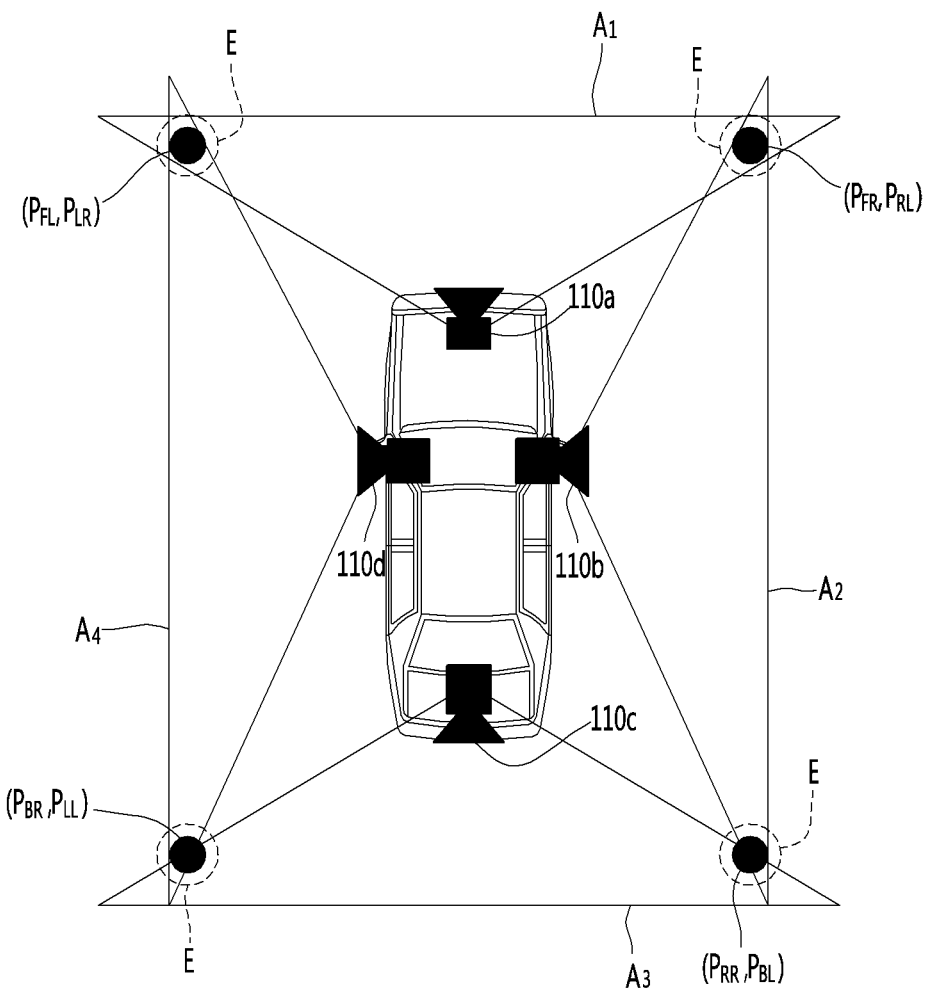
FIGS. 9 and 10 are exemplary views illustrating an image acquisition operation according to another embodiment.
Figure 10:
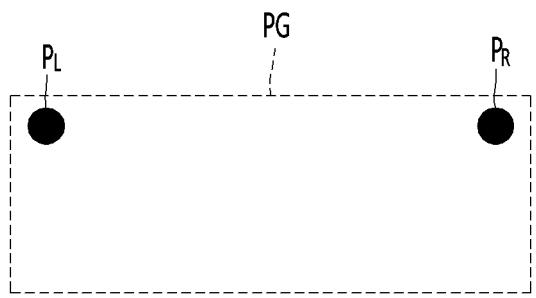
Figure 11:
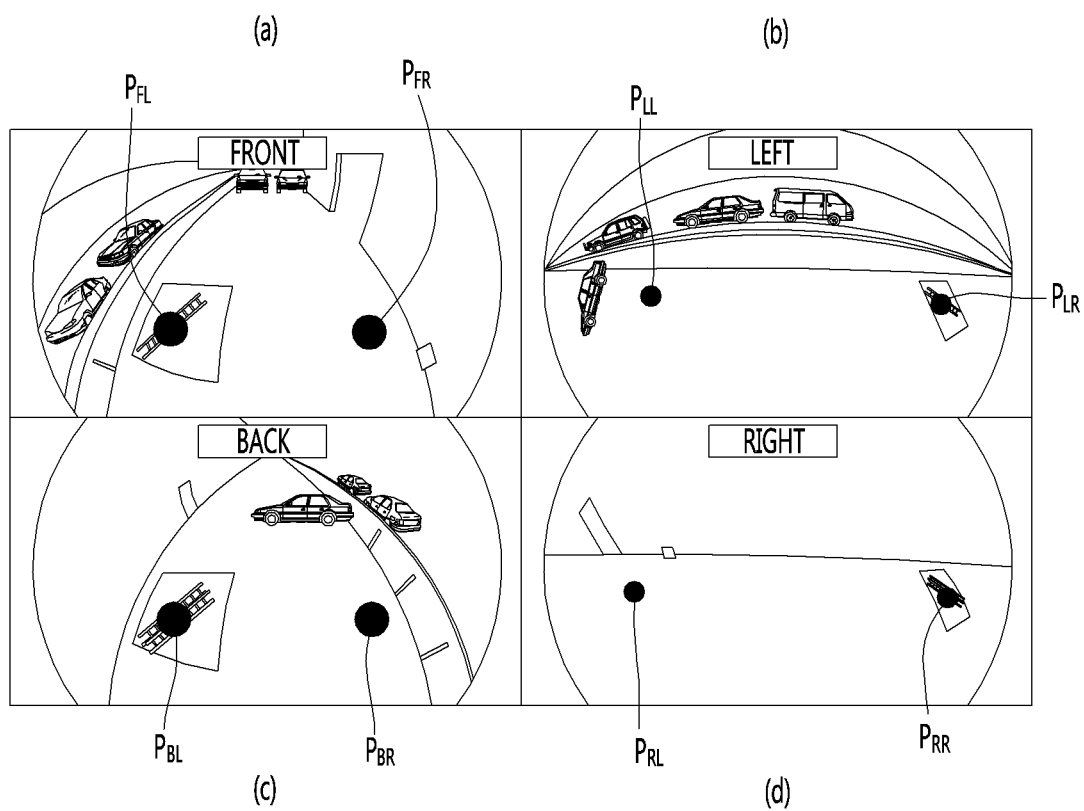
FIGS. 11 and 12 are exemplary views illustrating a combining operation of images according to another embodiment.
Figure 12:
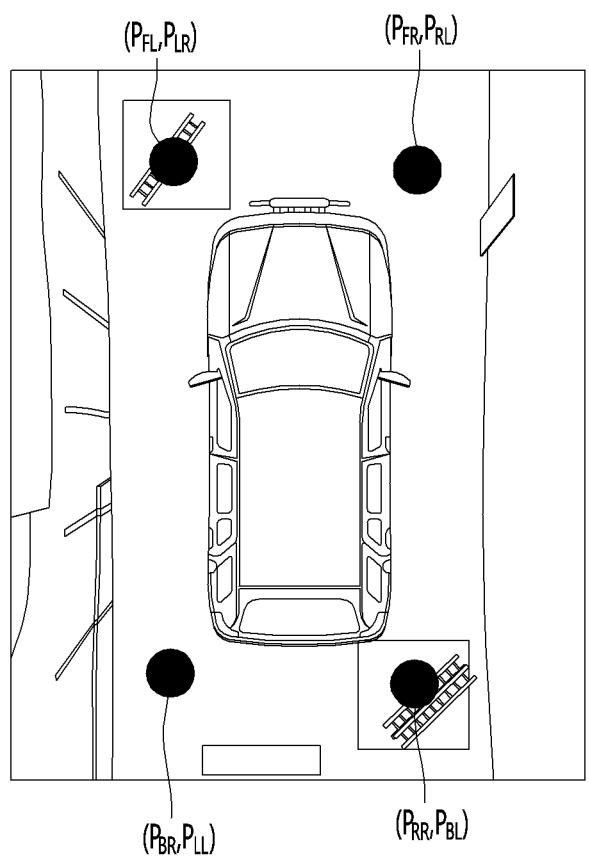

FIG. 8 is a flowchart illustrating an image acquisition operation according to another embodiment, FIGS. 9 and 10 are exemplary views illustrating an image acquisition operation according to another embodiment, and FIGS. 11 and 12 are exemplary views illustrating a combining operation of images according to another embodiment.

In another embodiment, an operation of capturing images of front, rear, left, and right directions of a vehicle and combining the captured images will be described as an example, and thus, the case in which an imaging unit including a first camera unit, a second camera unit, and a projector is configured in four units corresponding to the respective directions will be described as an example. However, the present invention is not limited thereto, and it is possible to constitute one imaging unit, and to combine a plurality of images acquired by capturing a plurality of regions by the imaging unit.

Referring to FIGS. 8 to 12, the control unit 170 irradiates a reference pattern from a projector 113 to the ground plane in which the vehicle is located according to the image combination operation mode of the vehicle (S810). Specifically, as shown in the exemplary view of FIG. 9, the reference pattern is irradiated to the ground plane of the position in which the vehicle is disposed at a predetermined angle via a first imaging unit 110*a*, a second imaging unit 110*b*, a third imaging unit 110*c*, and a fourth imaging unit 110*d* including a first camera 111 configured to correspond to the front, rear, left, and right directions of the vehicle and the projector 113 corresponding to the first camera 111.

The irradiated pattern is obtained by irradiating a pattern at a position as shown in FIG. 10, in which the images of second camera units 112 of the respective imaging units 110*a*, 110*b*, 110*c*, and 110*d* are overlapped with each other in capturing ranges A1, A2, A3, and A4 of the second camera unit 112. For example, the positions in which the images of the camera unit 112 are overlapped with each other may be left and right edge regions E of the photographed image. The pattern irradiated on the edge region E may be used as a combination reference point when images of the first to fourth cameras are combined.

Specifically, the projector 113 may irradiate reference patterns PFL and PFR to the left and right edge regions E in the capturing range A1 captured by the first camera 111 of the first imaging unit 110a. Also in the second capturing range A2 captured by the first camera 111 of the second imaging unit (110b), in the second capturing range A2 captured by the second camera 112, when reference patterns PLL and PLR are irradiated to the left and right edge regions E by the projector 113, the pattern irradiated at the edge region combines images based on the right pattern (PFR) of the first range and the left pattern (PRL) of the second range.

As described above, the images may be combined based on the right pattern PRR of the second capturing range A2 and the left pattern PBL of the third capturing range A3, the right pattern PBR of the third capturing range A3, the left pattern PLL of the fourth capturing range A4, the right pattern PLR of the fourth capturing range A4, and the left pattern PFL of the first capturing range A1. Therefore, a pattern image may be obtained by capturing the pattern irradiated in the capturing range (S820).

At this point, the control unit 170 may estimate a distance of the pattern image captured by the first camera unit 111.

Specifically, the distance between the first camera 111 and the captured pattern may be calculated via triangulation with respect to the pattern captured by the first camera unit 111 and the reference pattern irradiated by the projector 113.

The distance between the first camera 111 and the captured pattern is calculated based on a trigonometric function and is expressed by the following Equations 4 and 5. As shown in FIG. 4, the pattern irradiated via the projector 113 to a reference plane based on the information of the reference pattern may have a parallax as a focal distance of the pattern image captured via the first camera unit is recognized in an object plane.

$$\frac{D}{b} = \frac{Z_0 - Z_k}{Z_0}$$ [Equation 4]

$$\frac{d}{f} = \frac{D}{Z_k}$$ [Equation 5]

Here, Zk is a distance from the camera at a point k, Z0 is a depth value in the reference plane, d is a parallax recorded in the camera unit, and D is a shifted parallax of the point k at the captured pattern.

Entering the D value in Equation 5 into Equation 4, a pattern distance value Zk in the captured image is expressed by Equation 6.

$$Z_k = \frac{Z_0}{1 + \frac{Z_0}{f_o b} d}$$ [Equation 6]

The control unit 170 may calculate a position value for combination of the images captured by the second camera 112 based on the distance of the captured pattern calculated based on the trigonometric function and the position value of the pattern irradiated by the projector 113. Specifically, the imaging unit 110 is spaced apart from the ground as the imaging unit 110 is located at an upper portion of the vehicle. Therefore, in order to calculate an accurate position and distance of the pattern, the position information of the irradiated pattern and the position and distance information of the pattern extracted from the captured image are converted based on the ground on which the vehicle is located.

The control unit 170 combines the images captured by the second camera unit 112 of each of the imaging units 110a, 110b, 110c, and 110d based on the position of the pattern irradiated at a region in which each captured image converted based on the ground is overlapped with each other (S840). Specifically, a plurality of images captured by the second camera unit 112 are combined based on the reference pattern irradiated at the overlapping region of the images captured by the second camera unit 112 as a reference point.

Therefore, when a plurality of images are combined based on the confirmed reference pattern according to another embodiment as described above, the images are output through the display unit 130 as shown in FIGS. 11 and 12 (S850).

Specifically, as shown in the exemplary views (a) to (d) of FIG. 11, the image combination reference pattern irradiated by the projector 113 is captured by the first camera unit 111. FIG. 11 is an exemplary view in which the reference pattern is irradiated at the left and right edge regions of the capturing region, respectively. A front image (a), a left image (b), a rear image (c) and a right image of the vehicle acquired by the first camera unit 111 and the second camera unit 112 as shown in (a) to (d) of FIG. 11 may be combined into one image as in the exemplary view of FIG. 12. At this point, as a reference point of the image combination, the reference patterns included in the respective images may be matched and combined into one image.

Figure 13:
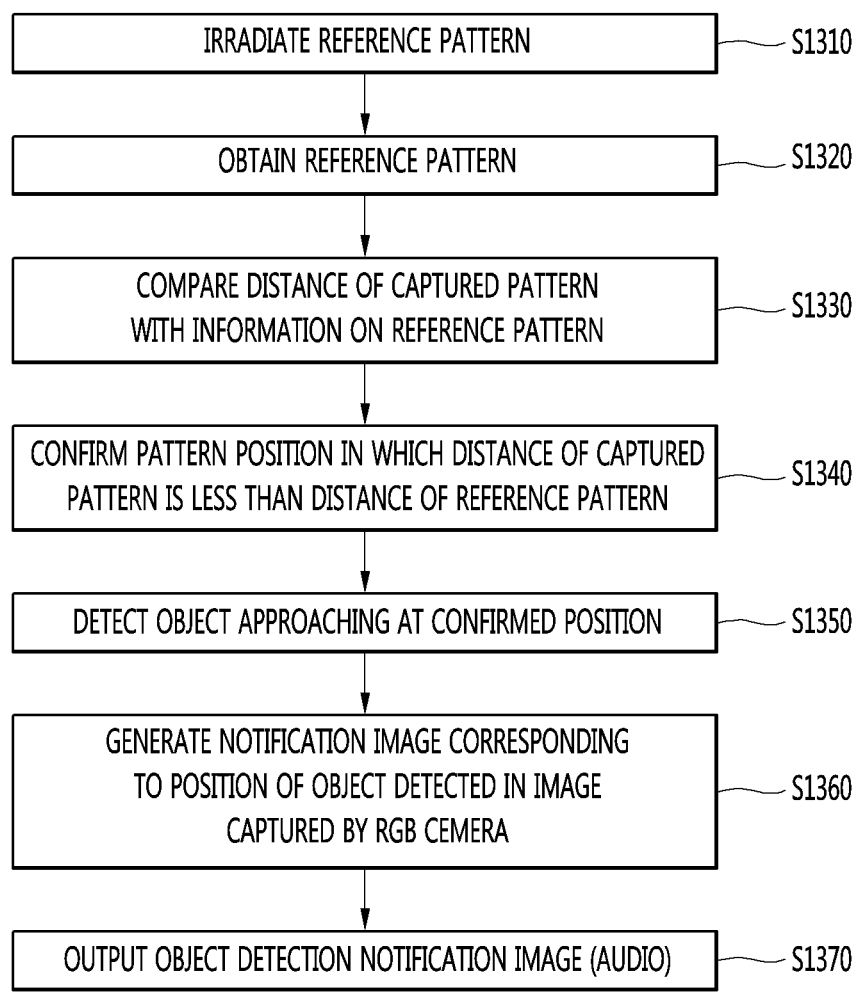
FIG. 13 is a flowchart of an image acquisition operation according to still another embodiment.
Figure 14:
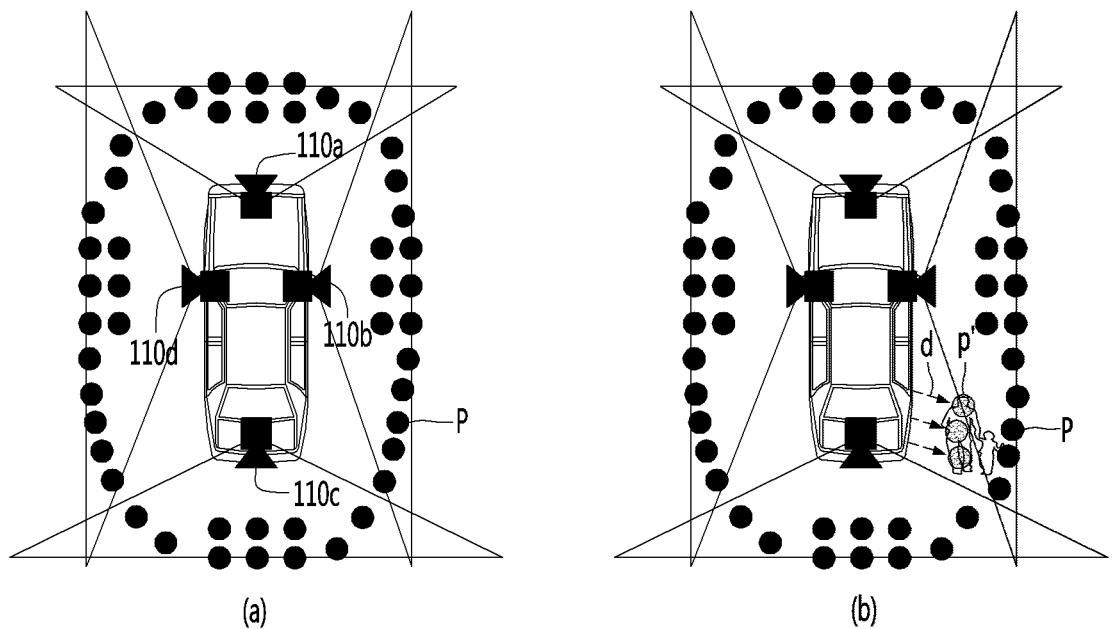
FIG. 14 is an exemplary view for explaining an image acquisition operation according to still another embodiment.
Figure 15:
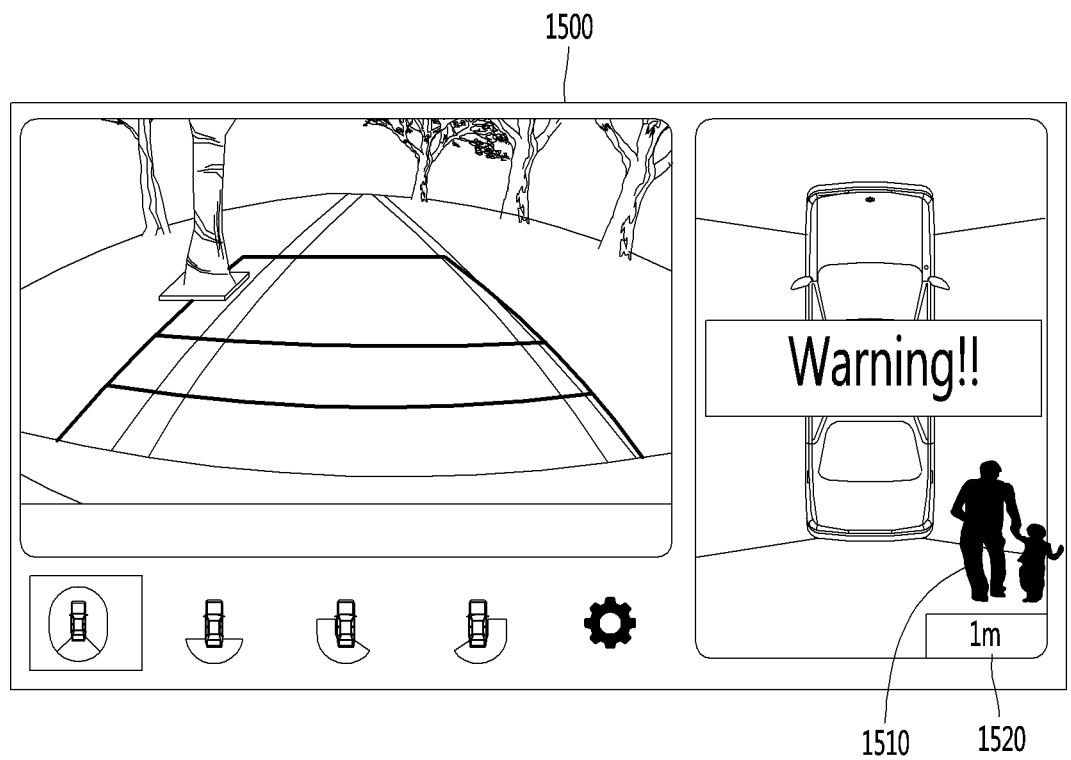
FIG. 15 is an exemplary view of a screen for explaining an output status of an acquired image acquired according to still another embodiment.

FIG. 13 is a flowchart illustrating an image acquisition operation according to still another embodiment, FIG. 14 is an exemplary view for explaining an image acquisition operation according to still another embodiment, and FIG. 15 is an exemplary view of a screen for explaining an output status of an image acquired according to still another embodiment.

In another embodiment, an operation of capturing images of front, rear, left, and right directions of a vehicle and combining the captured images will be described as an example, and thus, the case in which an imaging unit including a first camera unit, a second camera unit, and a projector is configured in four units corresponding to the respective directions will be described as an example. However, the present invention is not limited thereto, and it is possible to constitute one imaging unit, and to detect an object from images acquired by capturing a plurality of regions by the imaging unit.

Referring to FIGS. 13 to 15, the control unit 170 irradiates a reference pattern to a periphery of a vehicle by the projector 113 according to a surveillance mode around the vehicle (S1310). The reference pattern irradiated from the projector 113 may be infrared rays. Specifically, the reference pattern may be irradiated to a peripheral position of the vehicle via the plurality of imaging units 110a, 110b, 110c, and 110d configured to correspond to the front, rear, left, and right directions of the vehicle as shown in the example of FIG. 12(a).

As shown in FIG. 14, in the reference pattern, a plurality of patterns spaced from the periphery of the vehicle at a predetermined distance may be irradiated. Specifically, it is possible to easily determine an object becoming adjacent to the periphery of the vehicle by irradiating a plurality of patterns P to capturing range regions A1, A2, A3, and A4 captured by the second camera unit 112. In one example of the irradiated pattern, a plurality of patterns spaced apart from each other at a predetermined distance may be irradiated to have a circular shape or a quadrangle shape in the periphery of the vehicle.

The reference pattern is captured by the first camera unit 111 (S1320).

The control unit 170 compares the distance of the pattern captured by the first camera unit 111 with the reference pattern information (S1330). Specifically, the distance between the first camera 111 and the captured pattern is calculated through triangulation with respect to the pattern captured by the first camera unit 111 and the reference pattern irradiated by the projector 113.

The distance between the first camera unit 111 and the captured pattern is calculated based on a trigonometric function and is expressed by FIG. 4 and the following Equations 7 and 8. As shown in FIG. 4, the pattern irradiated via the projector 113 to a reference plane based on the information of the reference pattern may have a parallax as a focal distance of the pattern image of the image captured via the first camera unit 111 is recognized in an object plane.

$$\frac{D}{b} = \frac{Z_0 - Z_k}{Z_0} \quad \text{[Equation 7]}$$

$$\frac{d}{f} = \frac{D}{Z_k} \quad \text{[Equation 8]}$$

Here, Zk is a distance from the first camera unit 111 at a location k of the image detected in the object plane, Z0 is a depth value in the reference plane, d denotes a parallax recorded by the first camera unit 111, and D is a parallax shifted from the captured pattern.

Entering the D value in Equation 8 into Equation 7, a pattern distance value Zk in the captured image is expressed by Equation 9.

$$Z_k = \frac{Z_0}{1 + \frac{Z_0}{f_o b} d} \quad \text{[Equation 9]}$$

The control unit 170 may estimate a distance of the captured pattern calculated based on the trigonometric function.

When the pattern irradiated by the projector 113 is continuously captured by the first camera unit 111 according to the object detection mode operation and the estimated distance of the pattern is detected to be less than a predetermined distance while estimating the distance of the pattern, the control unit 170 may sense an object approaching (S1340). Specifically, when the reference pattern irradiated by the projector 113 is captured by the first camera unit 111 and the distance of the pattern is detected to be equal to or less than the estimated pattern distance while monitoring the distance of the pattern, the control unit 170 may detect that the object is approaching an irradiating range of the reference pattern. That is, when the irradiating position of the pattern P is recognized as P' by the object adjacent to the vehicle as in the example of FIG. 14(b), the distance d of the irradiated pattern P may be recognized as d Therefore, in this case, it can be detected that the object is adjacent to the vehicle (S1350).

As described above, when the object is adjacent to the vehicle, a display image is generated by the image processing unit 120 so that a notification image corresponding to the detected object position is displayed at the image captured by the second camera unit 112 via the display unit 130 as shown in FIG. 15 (S1360). Specifically, an image 1500 and an audio may be provided via the display unit 130 or the audio output unit 140 of the vehicle to notify vehicle passengers of the approaching of the object.

Although exemplary embodiments of the present invention have been illustrated and described above, the present invention is not limited to the particular embodiments described above. One of ordinary skill in the art to which the present invention pertains should be able to modify and embody the present invention in various ways without departing from the gist of the present invention defined in the claims below, and the modified embodiments should not be understood as being separate from the technical spirit or prospect of the present invention.

The invention claimed is:

1. An image acquisition apparatus, comprising
a projector configured to irradiate a reference pattern onto the ground;
a first camera unit configured to capture the reference pattern irradiated by the projector;
a second camera unit configured to capture an image including an area of the ground where the reference pattern is irradiated;
a storage unit configured to store information on the reference pattern to be irradiated by the projector, wherein the information includes a position value and a number value; and
a control unit configured to:
analyze difference information by comparing a position value of the reference pattern captured by the first camera unit with the position value of the reference pattern irradiated by the projector to generate an image correction value, and
change a rotation or position value of the image captured by the second camera unit based on the image correction value to generate a corrected image for the second camera unit,
wherein the control unit is further configured to determine an operation mode and vary the number value or the position value of the reference pattern to be irradiated by the projector.

2. The apparatus of claim 1, wherein the operation mode includes a calibration mode,
wherein the reference pattern is an image correction reference pattern for image correction, and
wherein the image correction value includes a rotation angle and a movement position value of the image captured by the second camera unit.

3. The apparatus of claim 1, further comprising:
a display unit configured to display images,
wherein the control unit is further configured to:
simultaneously display, via the display unit, an image of the reference pattern irradiated by the projector, an image of the reference pattern captured by the first camera unit and the image captured by the second camera unit.

4. The apparatus of claim 1, wherein the operation mode includes an image combining mode,
wherein the reference pattern is an image combination reference pattern for image combination;
wherein the projector irradiates the reference pattern at a position in which images captured by a plurality of second camera units are overlapped with each other in the image combining mode, and a control unit combines the images captured by the second camera unit based on the reference pattern captured by the first camera unit.

5. The apparatus of claim 4, wherein the control unit is configured to combine the plurality of images based on the image combination reference pattern irradiated to an overlapping area of the images captured by the plurality of second camera units as a reference point.

6. The apparatus of claim 1, wherein the projector irradiates a plurality of reference patterns in a capturing range captured by the second camera unit, and a control unit detects an object adjacent to a vehicle based on the plurality of reference patterns captured by the first camera unit.

7. The apparatus of claim 6, wherein the control unit detects approaching of the object when a distance of the plurality of reference patterns captured by the first camera unit is less than a predetermined distance of the reference pattern.

8. The apparatus of claim 6, further comprising:

a display unit for displaying object information adjacent to the vehicle.

9. The apparatus of claim 8, further comprising:

an image processing unit for generating an image to be outputted to the display unit by combining object information adjacent to the vehicle and the image captured by the second camera unit.

10. The apparatus of claim 6, wherein the operation mode includes an object detection mode, and wherein the reference pattern is an object detection reference pattern for object detection.

11. The apparatus of claim 1, wherein the reference pattern is infrared rays.

12. The apparatus of claim 1, wherein the projector, the first camera unit, and the second camera unit are configured as one module.

13. A method of acquiring an image, the method comprising:

storing information on a reference pattern to be irradiated by a projector, wherein the information includes a position value and a number value;

irradiating the reference pattern onto the ground by the projector;

capturing the irradiated reference pattern by a first camera unit;

capturing an image including an area of the ground where the reference pattern is irradiated by a second camera unit;

analyzing difference information by comparing a position value of the reference pattern captured by the first camera unit with the position value of the reference pattern irradiated by the projector to generate an image correction value;

changing a rotation or position value of the image captured by the second camera unit based on the image correction value to generate a corrected image for the second camera unit;

determining an operation mode; and varying the number value or the position value of the reference pattern to be irradiated by the projector.

14. The method of claim 13, wherein the operation mode includes a calibration mode, wherein the reference pattern is an image correction reference pattern for image correction, and wherein the image correction value includes a rotation angle and a movement position value of the image captured by the second camera unit.

15. The method of claim 13, further comprising:

simultaneously displaying an image of the reference pattern irradiated by the projector, an image of the reference pattern captured by the first camera unit and the image captured by the second camera unit.

16. The method of claim 13, wherein the irradiating of the reference pattern includes irradiating the reference pattern at a position in which a plurality of images captured by a plurality of second camera units are overlapped with each other.

17. The method of claim 16, wherein the operation mode includes an image combining mode, wherein the reference pattern is an image combination reference pattern for image combination, and wherein the processing of the image captured by the second camera unit includes combining the plurality of images based on the image combination reference pattern irradiated to an overlapping area of the images captured by the plurality of second camera units as a reference point.

18. The method of claim 13, wherein the irradiating of the reference pattern includes irradiating a plurality of reference patterns in a capturing range captured by the second camera unit.

19. The method of claim 18, wherein the operation mode includes an object detection mode, wherein the reference pattern is an object detection reference pattern for object detection, and wherein the processing of the captured image includes:

detecting approaching of an object by capturing the irradiated reference pattern by the first camera unit and comparing a distance of the captured pattern with a distance of the reference pattern, and generating an object notification image including the detected object.

20. The apparatus of claim 1, further comprising:

a display unit configured to display images, wherein the control unit is further configured to:

simultaneously display, via the display unit, an image of the reference pattern irradiated by the projector, an image of the reference pattern captured by the first camera unit, the image captured by the second camera unit and a guideline for indicating whether the image captured by the second camera unit is misaligned.

* * * * *